Patented May 11, 1954

2,678,319

UNITED STATES PATENT OFFICE 2,678,319

PREPARATION OF 2,3-DIHALOTETRAHYDRO-2-METHYLFURANS

Norman L. Hause, Grand Island, N. Y., assignor to E. I. du Pont de Nemours and Company, Wilmington, Del., a corporation of Delaware No Drawing. Application February 20, 1952, Serial No. 272,700

13 Claims. (Cl. 260—346.1)

This invention relates to the preparation of 2,3-dihalotetrahydro-2-methylfurans by the direct halogenation of 4,5-dihydro-2-methylfuran as illustrated by the following equation for the chlorination reaction:

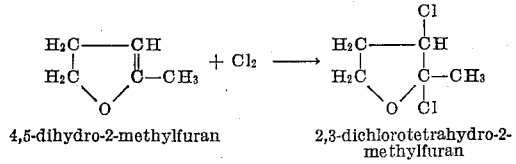

4,5-dihydro-2-methylfuran    2,3-dichlorotetrahydro-2-methylfuran

Paul et al., Bull. Soc. Chim. France, 520 (1950), have reported the preparation of the above dichloro compound by adding chlorine to a solution of 4,5-dihydro-2-methylfuran in carbon tetrachloride at −50° C. However, the conversion to 2,3-dichlorotetrahydro-2-methylfuran was only 52%. It has now been found that much higher conversions can be realized if the chlorination reaction, or the corresponding bromination reaction, is carried out in an improved way.

It is an object of the invention to provide an improved method for obtaining 2,3-dichlorotetrahydro-2-methylfuran, or the corresponding dibromo compound. A further object is the preparation of these compounds by the direct halogenation of 4,5-dihydro-2-methylfuran in an improved way. A still further object is to provide a commercially feasible method for carrying out such halogenation reactions. Other objects will be apparent from the following description.

The above objects are accomplished in accordance with the invention by adding 4,5-dihydro-2-methylfuran and either chlorine or bromine simultaneously but separately to a liquid reaction medium maintained at a suitable temperature in such amounts and relative rates as will correspond to a mole ratio of 4,5-dihydro-2-methylfuran to halogen within the range 0.9:1 to 1.2:1. Addition of the reactants in this manner should be continued until substantially all of the dihydromethylfuran to be reacted has been added, following which it is preferred that an excess of the halogen reactant be then added if an excess is not already present.

Addition of the reactants in the manner indicated avoids the presence of large amounts of either reactant in the reaction mixture. It has been found that this is highly desirable and essential to the obtainment of good conversions to the desired dihalo product. While a large excess of either reactant must be avoided, it has been found that the presence of a relatively small excess of either is permissible and that a slight excess of the dihydromethylfuran reactant is distinctly beneficial. If desired, the two reactants can be passed into the reaction medium in equimolar proportions, but an excess of more than 10% of the halogen reactant or of 20% of the other reactant should never be used.

It has been found that the presence of a substantial excess, e. g., more than 10%, of the halogen in the reaction mixture is highly undesirable in that it promotes substitution reactions with formation of hydrogen halide which actively catalyzes polymerization reactions. Preferably, the reactants are added in such manner as to avoid any excess of the halogen during the additions. The use of a slight excess of the dihydromethylfuran reactant assures the absence of any significant amount of free halogen in the reaction mixture and thus greatly decreases the occurrence of side reactions. However, 4,5-dihydro-2-methylfuran itself polymerizes quite readily under the reaction conditions normally employed so that any large excess of this reactant should also be avoided as previously noted. Accordingly, it has been found to be essential to the obtainment of best results that the reactants be passed into the reaction medium either in equimolar proportions or, and preferably, with a slight excess of the dihydromethylfuran reactant, which excess should not, however, exceed 20%. Most preferably, the excess of 4,5-dihydro-2-methylfuran will be within the range of 1 to 10%.

While it is distinctly advantageous to carry out the reaction with a small excess of the dihydromethylfuran reactant, best results are obtained by destroying any excess of that material before separating the 2,3-dihalotetrahydro-2-methylfuran product from the reaction mixture. This can be readily and most conveniently accomplished by adding an excess of the halogen reactant to the reaction mixture at or near the end of the reaction period, e. g., after all of the 4,5-dihydro-2-methylfuran which is to be reacted has been added. The amount of excess halogen added at this stage of the process is not particularly important, a 5 to 25% excess being generally adequate. Larger amounts, e. g., corresponding to an excess of 50% or more based on the amount theoretically required to react with all of the dihydromethylfuran previously added, can be used, but use of such larger amounts results in no further advantage and is generally wasteful.

Since the desired reaction proceeds rapidly and exothermically, it should be carried out in the presence of a suitable diluent liquid. The amount of the diluent employed should be sufficient to permit controlling the reaction temperature at the desired level in the equipment used. For most purposes it will be advantageous to employ the diluent in an amount at least equal in weight to the amount of 4,5-dihydro-2-methylfuran to be reacted. The preferred weight ratio of diluent to dihydromethylfuran is within the range of about 3:1 to 8:1. Larger amounts, e. g., corresponding to a ratio of 10:1 and higher, can be used if desired.

Any liquid which is inert towards the reactants and the reaction product under the conditions of use can be used as the diluent. Preferably, the diluent will be a solvent for the reactants and the dihalo product, and will also have a boiling point lower than that of the product in order to facilitate recovery of the latter by fractional distillation methods. Any of the solvents commonly used as reaction solvents in processes of this type can be used. Examples thereof are the saturated lower aliphatic chlorohydrocarbons such as carbon tetrachloride, chloroform and methylene chloride, the latter being especially suitable. All of the solvent may be employed as the initial reaction medium, or part or all may be added either continuously or intermittently to the reaction zone as the reaction proceeds. If desired, either or both of the reactants may be added as solutions in the solvent.

The process can be carried out batchwise or in a continuous manner. In continuous operations the reactants and solvent are added continuously in suitable proportions to the reaction mixture and the crude reaction product with solvent is continuously removed from the reaction vessel. Preferably, the mixture removed will then be treated with an excess of the halogen reactant, if such an excess is not already present, and the resulting crude product mixture can then be fractionally distilled to separate the product. Whether the process be carried out batchwise or continuously, agitation of the reaction mixture is desirable to aid in the transfer of heat from the mixture and to avoid undesired local excesses of either reactant. The reaction should be carried out under substantially anhydrous conditions and exposure of the reaction mixture or product to the atmosphere is best avoided.

Reaction temperatures not higher than 30° C. will ordinarily be used since side reactions occur excessively at higher temperatures. The desired reaction occurs rapidly, almost instantaneously, at any temperature within the range of about −80° to 30° C. Temperatures not higher than about −40° C., e. g., −70° C. to −40° C., are preferred since at such temperatures undesired substitution halogenation reactions are minimized.

The product dihalo compound can be readily recovered from the reaction mixture by fractional distillation methods. Preferably, the distillation is carried out under reduced pressure and as soon as the reaction has been completed. Good separation of the product fraction from lower boiling by-products is desirable because the latter are relatively unstable and tend to liberate hydrogen halide.

The invention is illustrated by the following examples:

*Example 1*

Two thousand grams of methylene chloride was charged to a flask equipped with a mechanical stirrer, a thermometer, a chlorine inlet tube and an additional funnel. After cooling the methylene chloride to −78° C., a 4,5-dihydro-2-methylfuran and chlorine were added separately and simultaneously to the methylene chloride. A total of 504 grams (6 moles) of the dihydro-2-methylfuran was added during 1 hour and 50 minutes while a total of 505 grams (7.1 moles) of chlorine was added during 2 hours. These materials were added at such relative rates that no substantial amount of free chlorine was ever present in the reaction mixture until all of the other reactant had been added, after which chlorine addition was continued until all had been added to provide a substantial excess. During most of the period when the two reactants were being added, the addition rates corresponded to an excess of about 1–10% of the dihydromethylfuran. The maximum temperature during the reaction was −58° C. Stirring of the reaction mixture was continued for 5 minutes after all the chlorine had been added, after which the methylene chloride was distilled from the mixture at a pressure of 20 to 30 mm. The resulting residue was then fractionally distilled through an 18 cm. Vigreux column to give a small forerun (15 grams) and 691 grams, corresponding to a conversion of 74.5%, of 2,3-dichlorotetrahydro-2-methylfuran boiling at 55 to 65° C. (7 to 15 mm.), $n_D^{20}$ 1.4795. The pot residue was 180 grams.

*Example 2*

Eighty grams (1.1 mole) of chlorine was added during 80 minutes to a solution of 84 grams (1 mole) of 4,5-dihydro - 2 - methylfuran in 222 grams of methylene chloride, while maintaining the reaction mixture at a temperature of −65 to −70° C. Fractional distillation of the reaction mixture as described in Example 1 yielded 67 grams of 2,3-dichlorotetrahydro-2-methylfuran, corresponding to a conversion of 45%.

*Example 3*

A mixture of 135 grams methylene chloride and 11 grams of calcium carbonate was cooled to −70° C. in a flask equipped with a stirrer, a thermometer and two separatory funnels. A solution of 35 grams (0.49 mole) of chlorine in 200 grams of methylene chloride and 26 grams (0.31 mole) of 4,5-dihydro-2-methylfuran were added simultaneously but separately to the contents of the flask in such a manner that the dihydromethylfuran was always added in slight excess until all of it had been added. Thereafter, the remainder of the chlorine solution was added, the reaction mixture finally becoming yellow due to the excess chlorine. The time for adding all of the reactants was 13 minutes. The mixture was stirred for an additional 5 minutes after the additions were completed. The temperature of the reaction mixture was kept below −40° C. The cooled mixture was then filtered to remove the carbonate and the methylene chloride was distilled from the filtrate under reduced pressure. Fractional distillation of the resulting residue gave the following fractions:

| Fraction | Pressure, mm.Hg | Boiling Point, °C. | $n_D^{22}$ | Grams |
|---|---|---|---|---|
| 1 | 9–10 | 62 | | 0.4 |
| 2 | 9–10 | 62–68 | 1.4802 | 34 |
| 3 | 2 | 72–78 | 1.5122 | 9 |
| 4 | | Residue | | 2 |

Fraction 2, representing a 71% conversion to 2,3-dichlorotetrahydro-2-methylfuran, was carefully refractionated and a center-cut sample, $n_D^{21}$ 1.4776, was analyzed for carbon and hydrogen.

Found: C, 38.99%; H, 4.99%. Theory for $C_5H_8OCl_2$: C, 38.72%; H, 5.17%.

Example 4

The effect of temperature on the conversion of the dihydromethylfuran to the desired dichloro compound is shown in the following table. The preparations corresponding to the data presented were carried out in the general manner described in Example 1 except that the temperature at which the reaction was effected was varied.

| Temperature, ° C. | Yield, Percent |
|---|---|
| −58 | 70–74 |
| −45 | 65–73 |
| −40 | 73 |
| −20 | 49–50 |
| +20 | 32 |

2,3-dibromotetrahydro-2-methylfuran can be prepared in the manner illustrated in the above examples and with similar results by using bromine in place of chlorine as the halogen reactant.

2,3-dichlorotetrahydro-2-methylfuran and the corresponding dibromo compound are valuable as chemical intermediates. Thus, they are useful as intermediates in the preparation of 4-methyl-5 (β-hydroxyethyl)-thiazole, a vitamin B1 intermediate, by reaction with thioformamide as disclosed in the application of Londergan and Schmitz, S. N. 272,694, filed February 20, 1952, now Patent No. 2,654,760.

I claim:

1. In a process for preparing a 2,3-dihalotetrahydro-2-methylfuran by reacting 4,5-dihydro-2-methylfuran with a halogen from the group consisting of chlorine and bromine, the improvement comprising adding the two reactants simultaneously but separately to a liquid reaction medium, said additions being made in such amounts and at such relative rates as will correspond to a mole ratio of 4,5-dihydro-2-methylfuran to halogen within the range 0.9:1 to 1.2:1.

2. The method of claim 1 wherein the mole ratio of 4,5-dihydro-2-methylfuran to halogen is within the range 1.01:1 to 1.10:1:

3. The method of claim 2 wherein after substantially all of the 4,5-dihydro-2-methylfuran to be reacted has been added to the reaction medium, an excess of the halogen is added.

4. The method of claim 1 wherein the halogen is chlorine.

5. The method of preparing a compound of the group consisting of 2,3-dichlorotetrahydro-2-methylfuran and 2,3-dibromotetrahydro-2-methylfuran comprising adding 4,5-dihydro-2-methylfuran and a halogen from the group consisting of chlorine and bromine simultaneously but separately to a liquid reaction medium maintained at a temperature not higher than 30° C., in such amounts and at such relative rates as will correspond to a mole ratio of 4,5-dihydro-2-methylfuran to halogen within the range 0.9:1 to 1.2:1.

6. The method of claim 5 wherein the reaction medium is maintained at a temperature not higher than −40° C.

7. The method of claim 5 wherein the mole ratio of 4,5-dihydro-2-methylfuran to halogen is within the range 1.01:1 to 1.10:1.

8. The method of claim 7 wherein after all the 4,5-dihydro-2-methylfuran to be reacted has been added, an excess of halogen is then added to the reaction mixture.

9. The method of claim 8 wherein a 5 to 25% excess of the halogen is finally added.

10. The method of producing 2,3-dichlorotetrahydro-2-methylfuran comprising adding 4,5-dihydro-2-methylfuran and chlorine to a liquid reaction medium maintained at a temperature not higher than 30° C., said additions being made simultaneously but separately in such amounts and at such relative rates as will correspond to a mole ratio of 4,5-dihydro-2-methylfuran to chlorine within the range 1:1 to 1.2:1, continuing such additions until substantially all of the 4,5-dihydro-2-methylfuran to be reacted has been added, and thereafter adding an excess of chlorine to the resulting mixture.

11. The method of claim 10 wherein the liquid reaction medium comprises methylene chloride.

12. The method of claim 10 wherein the reaction medium is maintained at a temperature not higher than −40° C.

13. The method of claim 12 wherein the 4,5-dihydro-2-methylfuran and chlorine are added in a molar ratio within the range 1.01:1 to 1.10:1 and a 5 to 25% excess of chlorine is finally added to the reaction mixture.

References Cited in the file of this patent

FOREIGN PATENTS

| Number | Country | Date |
|---|---|---|
| 609,803 | Great Britain | Oct. 8, 1948 |

OTHER REFERENCES

Paul et al.: "Bull. Soc. Chim. France" (1950) page 520.